July 13, 1943.   H. E. GOLDBERG   2,324,076
OPTICAL SYSTEM
Filed Sept. 13, 1941    3 Sheets-Sheet 1
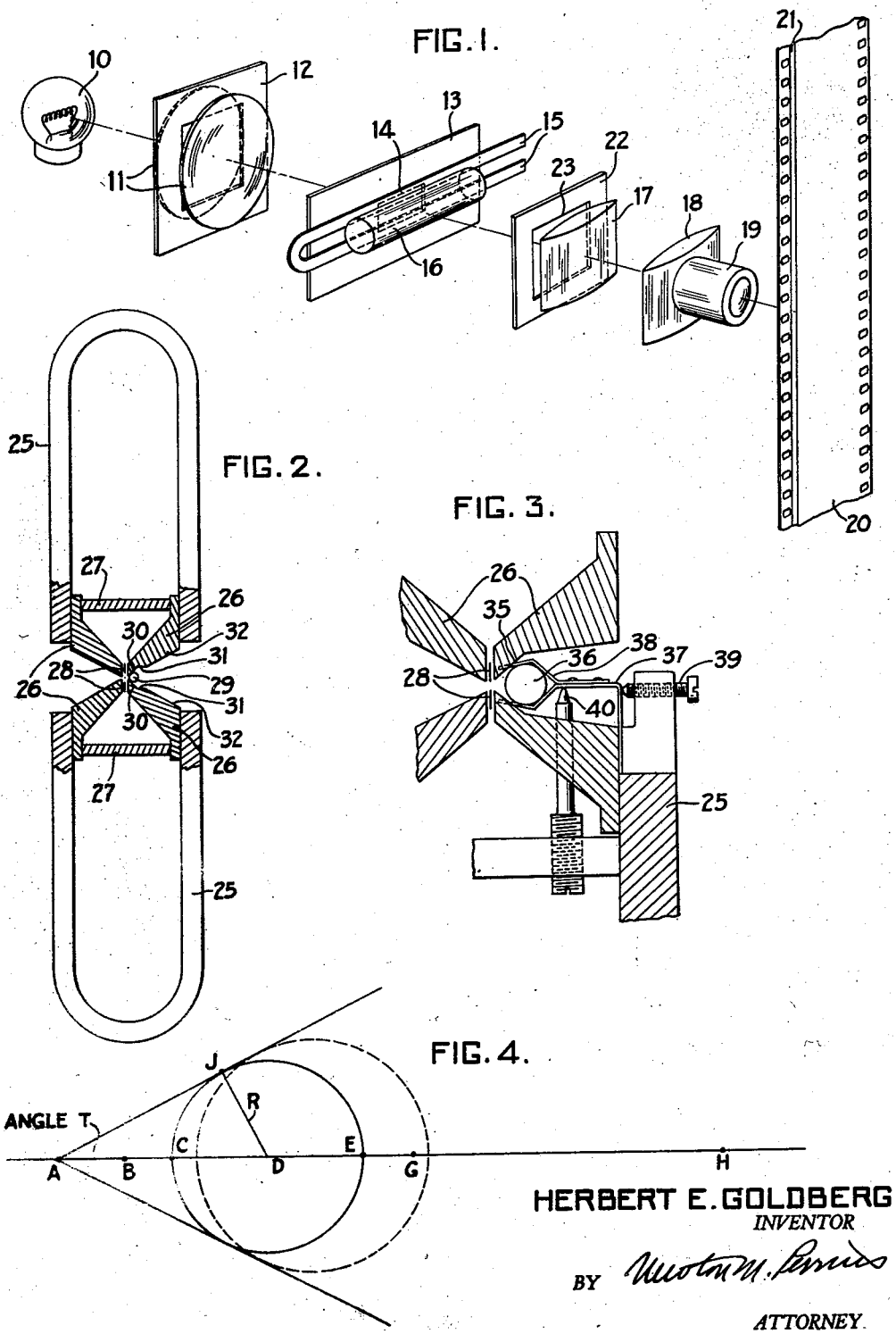
HERBERT E. GOLDBERG
INVENTOR

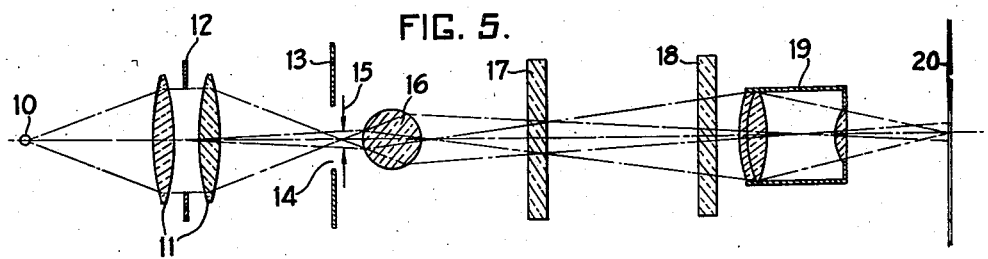
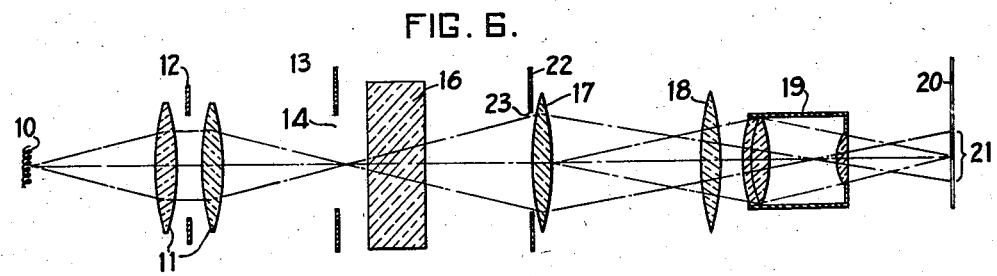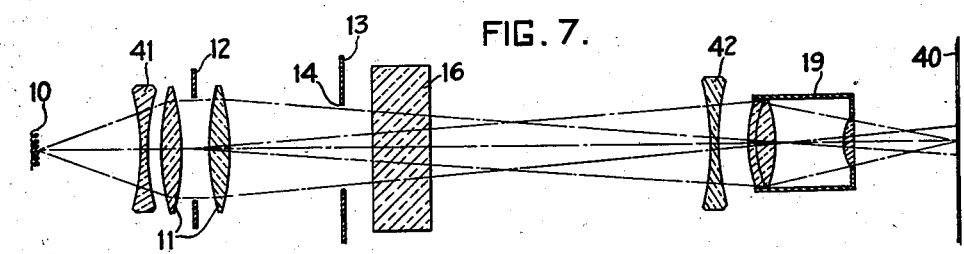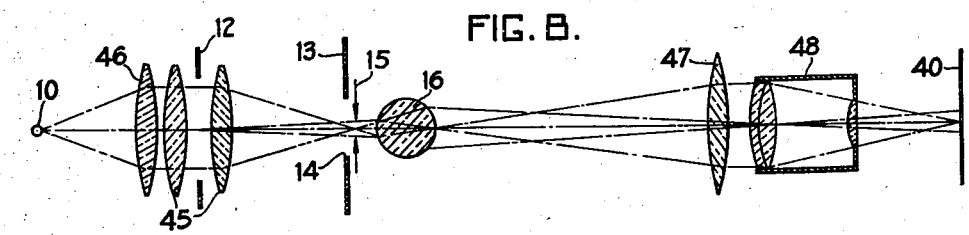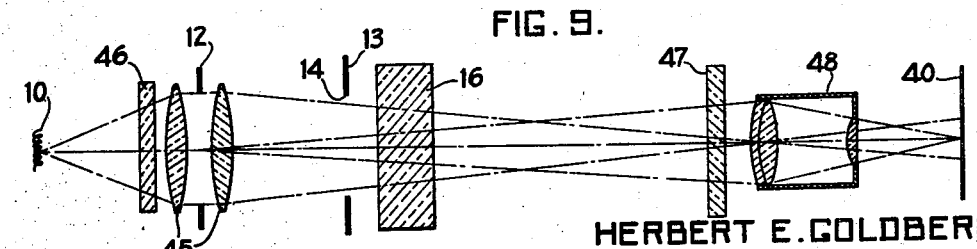

July 13, 1943.   H. E. GOLDBERG   2,324,076
OPTICAL SYSTEM
Filed Sept. 13, 1941   3 Sheets-Sheet 3

FIG. 10.

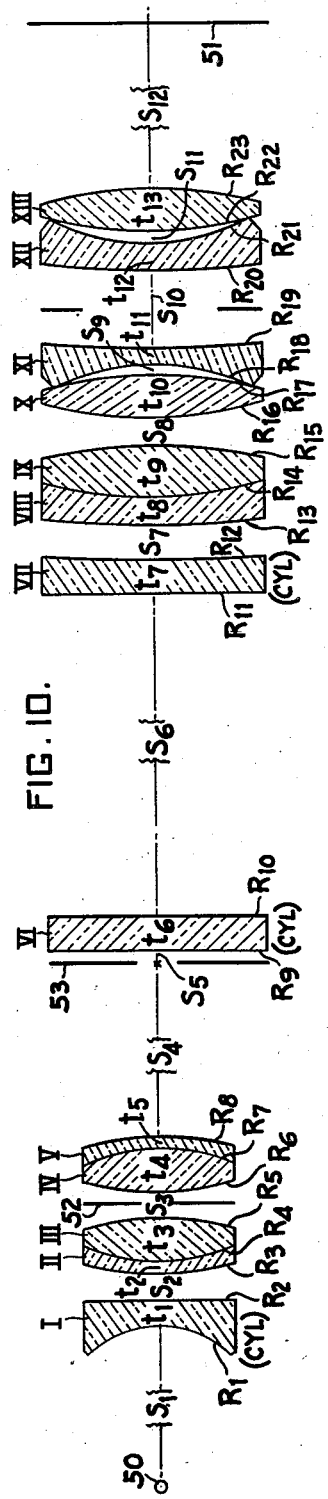

| LENS | $N_D$ GLASS | V | RADII | | THICKNESSES | |
|---|---|---|---|---|---|---|
| I | 1.516 | 64 | $R_1 =$ | $-7.0$ mm $\times \infty$ CYLINDER | $S_1 =$ | 20.4 mm |
|  |  |  | $R_2 =$ | $\infty$ | $t_1 =$ | 2.0 |
|  |  |  |  |  | $S_2 =$ | 1.9 |
| II | 1.617 | 36 | $R_3 =$ | $+36.1$ | $t_2 =$ | .5 |
| III | 1.515 | 65 | $R_4 =$ | $+10.3$ | $t_3 =$ | 2.7 |
|  |  |  | $R_5 =$ | $-15.8$ | $S_3 =$ | 2.0 |
| IV | 1.515 | 65 | $R_6 =$ | $+15.8$ | $t_4 =$ | 2.7 |
| V | 1.617 | 36 | $R_7 =$ | $-10.3$ | $t_5 =$ | .5 |
|  |  |  | $R_8 =$ | $-36.1$ | $S_4 =$ | 23.7 |
|  |  |  |  |  | $S_5 =$ | .5 |
| VI | 1.51 | 56 | $R_9 =$ | $\infty \times 1.0$ CYLINDER | $t_6 =$ | 2.0 |
|  |  |  | $R_{10} =$ | $\infty \times 1.0$ CYLINDER | $S_6 =$ | 135.0 |
| VII | 1.51 | 56 | $R_{11} =$ | $\infty \times \infty$ CYLINDER | $t_7 =$ | 2.0 |
|  |  |  | $R_{12} =$ | $+403.3$ | $S_7 =$ | 2.0 |
| VIII | 1.617 | 37 | $R_{13} =$ | $+205.6$ | $t_8 =$ | 1.8 |
| IX | 1.516 | 64 | $R_{14} =$ | $+54.2$ | $t_9 =$ | 3.2 |
|  |  |  | $R_{15} =$ | $-85.7$ | $S_8 =$ | 2.0 |
| X | 1.611 | 57 | $R_{16} =$ | $+18.6$ | $t_{10} =$ | 3.0 |
|  |  |  | $R_{17} =$ | $-25.0$ | $S_9 =$ | .4 |
| XI | 1.617 | 36 | $R_{18} =$ | $-18.2$ | $t_{11} =$ | 1.0 |
|  |  |  | $R_{19} =$ | $+420.6$ | $S_{10} =$ | 5.1 |
| XII | 1.617 | 36 | $R_{20} =$ | $+130.2$ | $t_{12} =$ | 1.0 |
|  |  |  | $R_{21} =$ | $+15.5$ | $S_{11} =$ | .6 |
| XIII | 1.611 | 57 | $R_{22} =$ | $+25.0$ | $t_{13} =$ | 3.0 |
|  |  |  | $R_{23} =$ | $-18.6$ | $S_{12} =$ | 18.8 |

HERBERT E. GOLDBERG
INVENTOR

BY *Newton M. Pennis*

ATTORNEY

Patented July 13, 1943

2,324,076

UNITED STATES PATENT OFFICE 2,324,076

OPTICAL SYSTEM

Herbert E. Goldberg, Rochester, N. Y., assignor to Eastman Kodak Company, Rochester, N. Y., a corporation of New Jersey Application September 13, 1941, Serial No. 410,757

9 Claims. (Cl. 88—24)

This invention relates to optical systems and particularly to optical systems used in sound motion pictures or electro-optical transmission systems to produce a spot of light for scanning.

It is an object of the invention to provide an optical system for producing a small area of light, preferably rectangular, of constant area and variable intensity.

It is a particular object of the invention to provide such a system employing a ribbon-type light valve for producing at least part of the variation in intensity in the area (either a spot or a line) of light. Thus the advantages of ribbon-type valves namely high intensity, linearity of reproduction, and relative freedom from trouble with overloading, are gained without the disadvantage of harmonics which are sometimes introduced when the slit image formed on the film is of variable width instead of purely variable intensity.

It is an object of the invention to provide a scanning optical system which is highly efficient, and gives accurate definition and high resolution. It is also an object of the invention to have such a system which is simple and compact.

The present invention gains all of its advantages by a simple trick which simultaneously does many different things. A small cylindrical rod lens about one or two mm. in diameter is placed very close to and behind the plane of the valve ribbon, so close in fact that the front surface of the rod acts almost entirely as a field lens at the ribbon and forms near the rear surface of this same rod an image of an aperture stop which is placed between the valve and the light source which illuminates the valve from the front.

Any type of ribbon valve may be used, with either a single or multiple ribbon system. For clarity, the terms front, back, horizontal, vertical, etc., are used throughout this specification and claims. However, it is to be understood that these terms do not refer to any absolute orientation and space but are merely relative to one another. When the valve has at least one of its ribbons horizontal, the cylindrical axis of the rod lens is also horizontal. The rear surface of the rod lens acts as a field lens at the image formed by the front surface of the rod lens. Furthermore this rear surface and the front surface to some extent cooperate to form an aerial image of the ribbon, between the rod lens and the image plane in which the spot or line of light is to be formed.

With this trick, the present invention consists of an optical system for forming in an image plane a small area of light of variable intensity and including the ribbon valve and the light source in front of the valve. The aperture stop referred to between the light source and the valve constitutes means for diaphragming the top and bottom of the light beam and the same stop or another one somewhere in the system is used for diaphragming the sides of this beam. The cylindrical rod lens is placed immediately behind the plane of the ribbon so that its front surface forms close to its rear surface a vertically punctual image of the top and bottom diaphragming means and the rear surface with slight assistance by the front surface, forms the aerial image of the ribbons, which is also vertically punctual. An objective system is placed at this aerial image preferably including some cylindrical surfaces so that it forms in the image plane a vertically punctual image of the rear surface of the rod and a horizontally punctual image of the side diaphragming means.

In one species of the invention used for sound recording an additional stop with appropriate field lens adjacent thereto constitutes the sides diaphragming means and is placed between the rod lens and the objective. Thus the objective system must have greater power in a horizontal plane to give a horizontally punctual image of this additional diaphragm stop than it has in a vertical plane wherein it forms a vertically punctual image of the rear surface of the rod lens. Thus the area of light used for sound recording is a long thin line.

A second species of the invention used for electro-optical scanning has the single aperture stop between the light source and the valve for both the sides diaphragming means and the top and bottom diaphragming means. In this case the objective means includes cylindrical surfaces so that it is weaker in the horizontal plane to form a horizontally punctual image of this diaphragm spot than it is in a vertical plane to form a vertically punctual image of the rear surface of the rod lens. In this connection it is pointed out that a negative cylinder with its cylindrical axis vertical is equivalent to a positive cylinder with its cylindrical axis horizontal provided that the spherical parts of the objective system have the proper power. Incidentally, in the second species of the invention a weak lens including cylindrical surfaces is spaced adjacent to the aperture stop to form a vertically punctual image of the light source in the plane of the valve ribbon and a horizontally punctual image of the light source in the objective system.

This invention may be used with either a coiled or ribbon type filament as a light source to form an image on sensitive film. Alternatively it can be used with a glow lamp or other variable intensity light source so that the light source and the ribbon valve constitute light valves in optical tandem as described in copending application, Serial No. 393,418, filed May 14, 1941, by Vincent C. Hall. Furthermore, instead of scanning a sensitive film, the variable intensity area of light may fall on another light valve of any type such as a ribbon type light valve and then this image may be refocused by a simple objective system onto a sensitive film. The additional valve in optical tandem with the ribbon type valve may be used for color correction or to square the effect of the first valve, both of which systems are described in the Hall application just mentioned. Furthermore, it may be used in connection with the Hall and Streiffert invention described in copending application, Serial No. 417,540 filed November 11, 1941.

The preferred embodiment of the invention involves as a sub-combination a method and means for mounting the cylindrical rod lens to give constant magnification independent of the diameter of the lens. To obtain this constant magnification, the rod lens is mounted in a mount having two surfaces which are flat and in planes intersecting in a horizontal line coplanar with the ribbon. The rod lens is in line contact with each of these surfaces so that the distance of the lens from the ribbon depends on the radius of the lens. If the angle between these planes is A, $$\sin\frac{A}{2} = \frac{2\left(1-\frac{1}{N}\right)}{\left(1+\frac{1}{M}\right)}$$

where N is the index of refraction of the lens and M is the magnification. Thus with a lens made of glass having an index of 1.5 a magnification of 10 requires the angle A to be 74 degrees, 36 minutes; a magnification of 100 requires the angle to be 82 degrees, 36 minutes, and for collimated light the angle should be 83 degrees, 36 minutes.

In actual practice, these surfaces are provided by milling out the pole pieces of the magnet used in the light valve. Obviously the depth of focus of this cylindrical rod lens at the ribbon plane, is very small and critical whereas the depth of focus at the other conjugate is very great so that the separation of the rod lens and the objective is not too critical.

Other objects and advantages of the invention will be understood from the following description when read in connection with the accompanying drawings in which:

Fig. 1 is a perspective view of an embodiment of the invention used for sound recording.

Fig. 2 is a vertical cross section illustrating the preferred method of mounting the cylindrical rod lens.

Fig. 3 shows an alternative method of mounting the rod lens.

Fig. 4 is a trigonometrical sketch corresponding to Fig. 2.

Figs. 5 and 6 are respectively vertical and horizontal cross sections of the arrangement shown in Fig. 1.

Fig. 7 is a modification of Fig. 6 when the system is used for electro-optical scanning.

Figs. 8 and 9 are respectively vertical and horizontal cross sections of an embodiment slightly different from that shown in Fig. 7.

Fig. 10 is a detailed sketch of the arrangement shown in Fig. 7.

Figs. 1, 5, and 6 all relate to the same embodiment of the invention and will be described simultaneously. In these figures light from a source 10 is focused by a condenser lens 11 onto the plane of the ribbons 15 of a ribbon-type light valve. Any pole pieces or other diaphragming means of the light valve is represented by a plate 13 having an aperture 14 therein. The top and bottom of the light beam is defined by the top and bottom edges of an aperture in a diaphragm 12 adjacent to the condenser lens 11. The sides of the light beam are defined by an aperture 23 in a diaphragm 22 positioned between the light valve and the image plane which in this case is a sensitive film 20 with an area 21 to receive a sound track.

According to the invention a small cylindrical rod lens 16 is placed immediately behind the ribbons 15 of the light valve with the front focus of the rod lens very close to the plane of the ribbons. The front surface of the rod lens 16 acts primarily as a lens to form near the rear surface of the same lens a vertically punctual image of the aperture in the diaphragm 12. The rear surface of the rod lens 16 thus acts as a field lens at this image and together with the front surface projects a vertically punctual image of the ribbons 15 into the entrance pupil of an objective system consisting of a cylindrical lens 18 and an ordinary high aperture objective 19. A cylindrical lens 17 is also positioned adjacent to the diaphragm 22 to act as a field lens at this diaphragm. The power of the objective system consisting of lenses 18 and 19 is such that it focuses a vertically punctual image of the image of 12 as formed near the front surface of the lens 16 onto the film 20 and a horizontally punctual image of the diaphragm 22 onto this film 20.

Thus on the film 20 there is an area of light in the form of a slit of constant dimensions but variable intensity. The top and bottom of the slit are defined by the top and bottom edges of the aperture in the diaphragm 12 and the ends of this slit image are defined by the edges of the aperture 23 in the diaphragm 22.

Fig. 2 illustrates the preferred method of mounting the cylindrical lens 16. In this Fig. 2 the magnets of the light valve are represented by 25 having pole pieces 26 and non-ferrous spacers 27 to hold the pole pieces in accurate adjustment. The ribbons 28 of the light valve are positioned between the pole pieces and a cylindrical rod lens 29 is mounted immediately adjacent to the plane of the ribbons and held in place by spacers or springs not shown. In order accurately to position this rod lens 29 and to give it constant magnification independent of its diameter, the surfaces 32 of the pole pieces 26 are accurately milled away as shown by the edges 30 and 31. The surfaces 30 are flat and in planes which intersect in a line coplanar with the ribbons 28. The lens 29 is placed in contact with these surfaces 30 and held thereby the springs at or near the end of the rod lens, but not shown.

Incidentally, all standard valves have the angle between the surfaces 32 relatively small in order to get the maximum concentration of magnetic field at the ribbons and to transmit light to a lens whose working aperture is generally not larger than f/2. Of course the straight portions 31 of the rear surface are not necessary and when the pole pieces are manufactured primarily for the present invention rather than by conversion of standard valves, I prefer to have them in the form shown in Fig. 3.

However, Fig. 3 is mainly to illustrate an embodiment wherein the cylindrical rod lens 36 is mounted for manual adjustment rather than to give automatically constant magnification for all diameters of lens. The only advantage of this system shown in Fig. 3 occurs mainly in experimental work wherein it is difficult to secure proper spacing of the ribbons 28 from the pole pieces and thus to insure that the line of intersection of the planes in which the surfaces 30 lie is accurately coplanar with the ribbons. Thus in Fig. 3 the surfaces 35 are not employed for aligning the lens 36. The lens is supported at its ends by clamps consisting of spring members 37 and 38 and adjustment of this lens is provided by machine screws 39 and 40 bearing on each of the springs 37. These machine screws are threaded into tappings in the mount or magnet as shown.

Fig. 4 illustrates why the arrangement shown in Fig. 2 gives constant magnification independent of the diameter of the rod lens. In this figure, A is the axial point on the line of intersection of the surfaces 30 and is coplanar with the ribbons 28. These surfaces intersect at an angle 2T. The cylindrical lens 29 is pressed into the pole pieces until the surface of the rod lens makes a line contact represented by the point J with each of the control surfaces and the center of the lens falls at the point D. The lens surface intersects the optic axis at the points C and E. The front focus of the lens is represented by the point B, the rear focus by the point G and the point conjugate to the point A by H. Since a cylindrical rod lens is symmetrical, the principal planes coincide and pass through the center D. Thus BD equals DG equals the focal length F of the lens. By the simple and well known formula, $$\frac{1}{F} = (N-1)\left(\frac{1}{R_1} - \frac{1}{R_2} + \frac{(N-1)}{N}\frac{S}{R_1 R_2}\right)$$

wherein $R_1$ and $R_2$ are the surface radii and $S$ the separation of the surfaces, one gets $$\frac{1}{F} = \frac{2}{R}\left(\frac{N-1}{N}\right)$$

Therefore $$\frac{R}{F} = 2\left(1 - \frac{1}{N}\right)$$

Also $$\frac{AB}{F} = \frac{F}{GH} = \frac{1}{M}$$

where M is the magnification.
From the figure $$\sin T = \frac{R}{AD} = \frac{R}{AB+F} = \frac{R}{\frac{F}{M}+F}$$

Therefore $$\sin T = \frac{R}{F\left(1+\frac{1}{M}\right)}$$

$$= \frac{2\left(1-\frac{1}{N}\right)}{\left(1+\frac{1}{M}\right)}$$

Thus the magnification depends only on T and N and is independent of the radius R of the lens. This is particularly valuable because of the difficulty of accurately forming thin rod lenses.

When it is desired to use the optical system according to the invention for electro-optical scanning, the small area of light should preferably be square rather than in the form of a slit of light. Figs. 7 to 10 illustrate a system for giving such a square spot of light. In Fig. 7 the diaphragm 12 acts both to diaphragm the top and bottom of the beam and to diaphragm the sides of the beam. Fig. 5 may be considered as the horizontal view of this Fig. 7 since the cylindrical lenses shown in both figures have no effect on the light in the vertical plane shown in Fig. 5. Thus the objective 19 focuses a vertically punctual image of an image of 12 formed by the cylindrical rod lens 16 close to its back surface. A negative cylindrical lens 42 immediately in front of the objective 19 and forming part of the objective system weakens the power of this system in the horizontal plane so that the system forms a horizontally punctual image of the sides of the aperture in the diaphragm 12. Thus the horizontal width of the spot equals the width of the aperture in the diaphragm 12 multiplied by the magnification of the objective system comprising lenses 42 and 19. The height of this spot equals the height of the aperture in the diaphragm 12 multiplied both by the magnification of the front surface of the lens 16 and the magnification of the objective 19 as shown in Fig. 5. With the arrangement shown in detail in Fig. 10, the aperture in the diaphragm 52 which corresponds to the diaphragm 12 should be 9.40 mm. high and 1.00 mm. wide in order to give a square spot.

Since the lens 17 has been omitted from Fig. 7, and since the condenser consisting of lenses 11 focuses the objective 10 in the plane of the ribbons, there would be a tendency to refocus this image in the film 40 by the objective 19 and the lens 42 which image is horizontally punctual. This is due to the fact that the depth of focus of the objective system, when focused on diaphragm 12 extends almost to include the diaphragm 13 wherein the image is formed. For this reason and for increased efficiency, a negative cylindrical lens 41 is positioned adjacent to the condenser 11 to weaken its power in the horizontal plane so that it projects a horizontally punctual image of the filament 10 into entrance pupil of the objective system consisting of lenses 19 and 42. Thus both systems have a horizontally punctual image of the filament in the objective system and a vertically punctual image of the filament in the valve ribbons. Although the arrangement shown in Fig. 7 has a coil filament 10 for the light source and a sensitive film 40 at the image plane, I also employ this system in electro-optical color correction described in the copending applications mentioned above, wherein the light source is a glow lamp and the spot of light impinges on a third light valve which in one case is placed in electrical series with the light valve ribbons 15 and in another case is used for separate type of correction, that is, for a separate type of light modulation.

Figs. 8 and 9 show an equivalent system in which the negative cylindrical lenses 41 and 42 are replaced by positive cylindrical lenses 46 and 47 with their cylindrical axes horizontal. In this arrangement, the lenses 45 constituting a condenser are weaker than the lenses 11 since the lens 46 cooperates with the lenses 45 to form the vertically punctual image of the filament 10 in the plane of the ribbons 15 whereas the lenses 45 alone merely form a horizontally punctual image of this filament in the objective system consisting of lenses 47 and 48. Similarly the objective 48 is weaker than the objective 19, since the lens 47 cooperates with the objective 48 to form a vertically punctual image of the image of 12 as formed near the back surface of the lens 16 whereas the objective 19 as shown in Fig. 5 performs this function entirely alone. The lens 48 merely has sufficient power to form a horizontally punctual image of the diaphragm 12 in the image plane.

One specific embodiment of the invention is shown in Fig. 10 in which the source of illumination is represented by the circle 50, the diaphragm of the system by the lines 52, the plane of the ribbons by the lines 53 and the image plane by the line 51. In this specific embodiment, the lenses have the following characteristics.

| Lens | Glass | | Radii | Thicknesses |
|---|---|---|---|---|
| | $N_D$ | V | | |
| I | 1.516 | 64 | $R_1 = -7.0 \times \infty$ cylinder<br>$R_2 = \infty$ | $S_1 = 20.4$ mm.<br>$t_1 = 2.0$<br>$S_2 = 1.9$ |
| II | 1.617 | 36 | $R_3 = +36.1$ | $t_2 = .5$ |
| III | 1.515 | 65 | $R_4 = +10.3$<br>$R_5 = -15.8$ | $t_3 = 2.7$<br>$S_3 = 2.0$ |
| IV | 1.515 | 65 | $R_6 = +15.8$ | $t_4 = 2.7$ |
| V | 1.617 | 36 | $R_7 = -10.3$<br>$R_8 = -36.1$ | $t_5 = .5$<br>$S_4 = 23.7$ |
| | | | $R_9 = \infty \times +1.0$ cylinder | $S_5 = .5$ |
| VI | 1.51 | 56 | $R_{10} = \infty \times +1.0$ cylinder<br>$R_{11} = \infty$ | $t_6 = 2.0$<br>$S_6 = 135.$ |
| VII | 1.51 | 56 | $R_{12} = +403.3 \times \infty$ cylinder | $t_7 = 2.0$ |
| VIII | 1.617 | 37 | $R_{13} = +205.6$ | $S_7 = 2.0$ |
| IX | 1.516 | 64 | $R_{14} = +54.2$<br>$R_{15} = -85.7$ | $t_8 = 1.8$<br>$t_9 = 3.2$ |
| X | 1.611 | 57 | $R_{16} = +18.6$<br>$R_{17} = -25.0$ | $S_9 = 2.0$<br>$t_{10} = 3.0$ |
| XI | 1.617 | 36 | $R_{18} = -18.2$<br>$R_{19} = +420.6$ | $S_9 = .4$<br>$t_{11} = 1.0$ |
| XII | 1.617 | 36 | $R_{20} = +130.2$<br>$R_{21} = +15.5$ | $S_{10} = 5.1$<br>$t_{12} = 1.0$ |
| XIII | 1.611 | 57 | $R_{22} = +25.0$<br>$R_{23} = -18.6$ | $S_{11} = .6$<br>$t_{13} = 3.0$<br>$S_{12} = 18.8$ |

Having thus described various embodiments of my invention, I wish to point out that it is not limited to these structures but is of the scope of the appended claims.

What I claim and desire to secure by Letters Patent of the United States is:

1. An optical system for forming in an image plane a small area of light of variable intensity comprising a ribbon light valve mounted in front of the image plane with at least one ribbon horizontal for vertical movement, means for illuminating the valve from the front, means between the illuminating means and the valve for diaphragming the top and bottom of the light beam, means for diaphragming the sides of the light beam, a cylindrical rod lens of small diameter positioned with its cylindrical axis horizontal and with its front focus close behind the ribbon, the front surface of the rod focusing near the rear surface a vertically punctual image of the top and bottom diaphragming means and the rod forming between the rod and the image plane a vertically punctual image of the ribbon and objective means near the latter image for forming in the image plane a vertically punctual image of the rear surface of the rod and a horizontally punctual image of the sides diaphragming means.

2. An optical system according to claim 1 in which a single diaphragm between the illuminating means and the valve constitutes both diaphragming means and a partly cylindrical field lens is positioned near the diaphragm for forming a vertically punctual image of the illuminating means near the ribbon and a horizontally punctual image of the illuminating means near the objective means.

3. An optical system according to claim 1 in which a field lens is included for forming an image of the illuminating means near the ribbon, the sides diaphragming means is between the rod and the objective means and a cylindrical field lens is included for focusing a horizontally punctual image of the ribbon in the objective means.

4. An optical system according to claim 1 in which the rod lens is so near the ribbon that its vertical diameter subtends at the ribbon an angle greater than 60°.

5. An optical system according to claim 1 in which the light valve includes pole pieces behind the ribbon and respectively above and below the optic axis of the system, the paraxial portion of the rear surfaces of said pole pieces are flat and in planes which intersect in a horizontal line coplanar with the ribbon and the rod lens is in contact with said portions whereby the vertical magnification of the rod lens is independent of its diameter.

6. An optical system according to claim 1 in which the light valve includes pole pieces behind the ribbon and respectively above and below the optic axis of the system, the paraxial portion of the rear surfaces of said pole pieces are flat and in planes which intersect in a horizontal line coplanar with the ribbon and the rod lens is in contact with said portions whereby the vertical magnification of the rod lens is independent of its diameter, said planes intersecting at an angle A containing the rod lens where $$\sin \frac{A}{2} = 2 \frac{\left(1 - \frac{1}{N}\right)}{1 + \frac{1}{M}}$$

where N is the index of refraction of the rod lens and M is said magnification.

7. An optical system according to claim 1 in which the light valve includes pole pieces behind the ribbon and respectively above and below the optic axis of the system, the paraxial portion of the rear surfaces of said pole pieces are flat and in planes which intersect in a horizontal line coplanar with the ribbon and the rod lens is in contact with said portions whereby the vertical magnification of the rod lens is independent of its diameter, the index of refraction of the rod lens being about 1.5 and said planes intersecting at an angle between 75° and 85° whereby said magnification is great.

8. An optical element for use with a ribbon type light valve having at least one horizontal ribbon comprising mounting means adjacent to the ribbon and including two surfaces which are flat and in planes intersecting in a horizontal line coplanar with the ribbon and a thin cylindrical rod lens with its cylindrical axis horizontal and its surface in line contact with each of said flat surfaces, the angle at which said planes intersect being greater than 75°.

9. An optical element for use with a ribbon type light valve having at least one horizontal ribbon comprising mounting means adjacent to the ribbon and including two surfaces which are flat and in planes intersecting in a horizontal line coplanar with the ribbon and a thin cylindrical rod lens with its cylindrical axis horizontal and its surface in line contact with each of said flat surfaces, whereby the vertical magnification by the rod lens is independent of its radius, the angle A at which said planes intersect being such that $$\sin \frac{A}{2} = 2 \frac{\left(1 - \frac{1}{N}\right)}{1 + \frac{1}{M}}$$

where N is the index of refraction of the rod lens and M is said magnification.

HERBERT E. GOLDBERG.